US006423277B1

United States Patent
Gravitt et al.

(10) Patent No.: US 6,423,277 B1
(45) Date of Patent: Jul. 23, 2002

(54) METHOD AND APPARATUS FOR IMPROVING OXIDATION OF NITRIC OXIDE USING IRRADIATED OXIDIZING COMPOUNDS

(75) Inventors: Alan C. Gravitt, College Park; Thomas L. Isaac, Newnan, both of GA (US)

(73) Assignee: ICA TriNova LLC, Forest Park, GA (US)

(*) Notice: Subject to any disclaimer, the term of this patent is extended or adjusted under 35 U.S.C. 154(b) by 0 days.

(21) Appl. No.: 09/488,802

(22) Filed: Jan. 21, 2000

Related U.S. Application Data
(60) Provisional application No. 60/116,948, filed on Jan. 21, 1999.

(51) Int. Cl.[7] .................................................. B01J 19/08
(52) U.S. Cl. .................................... 422/186.04; 422/186
(58) Field of Search ........................... 422/186, 186.04; 204/164

(56) References Cited

U.S. PATENT DOCUMENTS

| | | | |
|---|---|---|---|
| 4,350,669 A | * 9/1982 | Izumi et al. ................. | 423/235 |
| 4,426,364 A | 1/1984 | Cooper | |
| 4,783,325 A | * 11/1988 | Jones ........................... | 423/235 |
| 4,883,570 A | * 11/1989 | Efthimion et al. ........... | 204/164 |
| 5,047,219 A | 9/1991 | Epperly et al. | |
| 5,285,581 A | * 2/1994 | Walker .......................... | 34/28 |
| 5,397,444 A | 3/1995 | Zimek et al. | |
| 5,525,783 A | * 6/1996 | Tran et al. ..................... | 219/700 |
| 5,532,462 A | * 7/1996 | Butwell et al. ............... | 219/695 |
| 5,670,122 A | 9/1997 | Zamansky et al. | |
| 5,811,631 A | 9/1998 | Cripe et al. | |
| 5,972,711 A | 10/1999 | Barclay et al. | |
| 6,004,128 A | 12/1999 | Kurata | |
| 6,030,506 A | 2/2000 | Bittenson et al. | |
| 6,117,403 A | * 9/2000 | Alix et al. .................... | 423/210 |

FOREIGN PATENT DOCUMENTS

| | | |
|---|---|---|
| EP | 0 295 083 A2 | 12/1988 |
| EP | 0 680 243 A2 | 11/1995 |
| EP | 0 845 287 A1 | 6/1998 |
| WO | WO 98/11982 | 3/1998 |
| WO | WO 98/30312 | 7/1998 |

OTHER PUBLICATIONS

International Search Report for International Application No. PCT/US00/01589, dated Jun. 6, 2000.

* cited by examiner

*Primary Examiner*—Kishor Mayekar
*Assistant Examiner*—Thao Tran
(74) *Attorney, Agent, or Firm*—Alston & Bird LLP

(57) ABSTRACT

The present invention is a method and apparatus that uses microwave energy to produce highly active forms of oxidizing compounds that react with nitric oxide and other lower valence components in gaseous streams to form compounds that can be readily removed by conventional pollution abatement processes. An oxidation chamber is used to simultaneously expose the oxidizing compound to microwave energy and contact it with the gaseous stream. The present invention provides a reliable, cost effective means of oxidizing pollutants into forms that can be effectively removed using existing pollution abatement devices.

3 Claims, 4 Drawing Sheets

METHOD AND APPARATUS FOR IMPROVING OXIDATION OF NITRIC OXIDE USING IRRADIATED OXIDIZING COMPOUNDS

CROSS-REFERENCE TO RELATED APPLICATIONS

This application claims the benefit of U.S. Provisional Application Ser. No. 60/116,948, filed Jan. 21, 1999, under 35 U.S.C. §119(e).

FIELD OF THE INVENTION

The present invention relates to methods and apparatus for oxidizing nitric oxide (NO) present in a gas stream and converting $SO_3$, VOCs, and other pollutants using oxidizing compounds thus forming compounds that can be more readily removed from the gas stream by conventional means. In particular, the present invention employs microwave energy to activate oxidizing compounds that oxidize NO and that convert other gaseous components into more desirable compounds to allow removal of these gaseous components using pollution control devices such as wet scrubber systems.

BACKGROUND OF THE INVENTION

Carbonaceous fuels such as coal, oil, and other low molecular weight hydrocarbons are widely used in a range of combustion operations including utility boilers, industrial furnaces, and the like. Combustion of these carbonaceous fuels at high temperatures is considered to be beneficial due to a reduction in carbon monoxide emission and more efficient combustion. However, high temperature combustion also promotes the production of nitrogen oxides, also referred to as $NO_x$, in the form of nitric oxide, nitrogen dioxide and the like. Nitrogen oxides are known to form ground level ozone, to comprise a major irritant in smog and to be a significant contributor to acid rain.

Typically, nitrogen oxides can be present in effluent combustion gas mixtures at concentrations ranging from about 200 to about 1,000 parts per million (ppm). Nonetheless, these relatively small concentrations are significant due to the rapid rate at which effluent combustion gases are produced. For example, a typical 500 megawatt power plant emits approximately 1,000,000 cubic feet per minute of combustion gases into the atmosphere.

The detrimental impacts of effluent emissions continues to pose a significant environmental concern. For example, despite efforts to the contrary, ground level ozone concentrations still exceed federal guidelines in many urban areas in the United States. Under the Clean Air Act and its amendments, such ozone nonattainment areas must implement stringent $NO_x$ emissions regulations. These minimal emissions levels are attainable only by treatment of the flue gases exiting the combustion chamber.

The effluent streams of many large utility boilers are currently fitted with extensive scrubbing systems, designed for the removal of sulfur dioxides. It would be highly advantageous to use this existing scrubbing equipment to remove $NO_x$ from the effluent, as well. Unfortunately, scrubbing processes are generally only effective at scrubbing higher valence nitrogen oxides, such as nitrogen dioxide.

A variety of techniques have been proposed to oxidize nitric oxide and other oxidizable pollutants. For example, nitric oxide can be reacted with an oxidizing compound, such as hydrogen peroxide, particularly at elevated temperatures. In particular, it is known in the art that hydrogen peroxide can be injected directly into either the combustion chamber or the exiting flue gases.

However, direct injection of hydrogen peroxide is problematic. Direct injection of hydrogen peroxide into the combustion chamber can suppress the combustion temperature, resulting in a loss of combustion efficiency. Also, direct injection of hydrogen peroxide into the combustion chamber can result in the decomposition of a significant percentage of the hydrogen peroxide, thus reducing the quantity of hydrogen peroxide available to participate in the oxidation reaction. In contrast, injection of hydrogen peroxide into the flue gases can reduce the reactivity of the hydrogen peroxide, due to the lower temperature of the effluent gas traveling down the flue. In situ heating methods, such as spraying the hydrogen peroxide onto a heated surface placed within the flue, e.g. a hot plate, can aid in the vaporization and reactivity of hydrogen peroxide. However, such in situ contact heating methods also tend to decompose a large percentage of the injected hydrogen peroxide.

SUMMARY OF THE INVENTION

The present invention provides a method and apparatus that uses highly reactive forms of oxidation compounds to oxidize lower valence compounds such as nitric oxide, from gaseous streams, particularly combustion effluent streams, without sacrificing combustion temperature or decomposing significant amounts of the oxidant. Other compounds that may be converted in accordance with the invention include $SO_3$ and volatile organic compounds. The present invention yields oxidized effluent components that can be readily removed by conventional pollution abatement processes such as wet scrubbing. This invention is based in part on the discovery that the reactivity of oxidizing compounds, such as hydrogen peroxide, can be increased by irradiation with microwave energy without inducing significant decomposition of the oxidizing compound or loss of combustion efficiency.

In one particularly advantageous aspect of the invention, a method for oxidizing nitric oxide is provided including the steps of introducing an oxidizing compound into an oxidation chamber, activating the oxidizing compound by exposing the oxidizing compound to microwave energy, and contacting the activated oxidizing compound with a gaseous stream containing nitric oxide to convert the nitric oxide into a scrubbable form of nitrogen oxide such as nitrogen dioxide. The oxidizing compound can be dissolved in an oxidizing solution. The oxidizing compound can be introduced into the oxidation chamber by a variety of processes including nebulizing, using a wicking system, or combinations thereof. The activated oxidizing compound can be in the form of a vapor, gas, or free radical. In one particularly advantageous embodiment, the oxidizing compound is hydrogen peroxide. In addition, the oxidation process can be optimized through use of a closed loop system that monitors the residual nitric oxide in the oxidized gas stream and controls the amount of oxidizing solution introduced into the oxidation chamber and/or the microwave energy input. The oxidized nitric oxide formed by the methods of the present invention can then be removed from the oxidized gas stream by processes such as wet scrubbing.

The invention further relates to an apparatus for performing the methods of the present invention. In one particularly advantageous embodiment, an apparatus for oxidizing a nitric oxide-containing gaseous stream is provided, including an oxidation chamber for contacting nitric oxide with an activated oxidizing compound, a corrosion shield that lines the oxidation chamber, at least one distributor to introduce the oxidizing compound into the oxidation chamber, and at least one microwave generator. The oxidation chamber can optionally be fitted with baffles for facilitating the mixing of the nitric oxide-containing gaseous stream and the activated oxidizing compound. In one advantageous embodiment, the oxidation chamber is comprised of a cylindrical member.

Yet another aspect of the invention relates to an effluent gas oxidation system for forming highly activated oxidizing compounds, such as hydrogen peroxide, in a compact system that will easily allow retrofitting of existing exhaust gas piping and stacks. In addition, aspects of the present invention are directed to an effluent gas emission system comprising a combustion process flue into which an effluent gas oxidation system has been secured upstream of a wet scrubber. A benefit of the present invention is that the existing effluent gas flues of combustion processes can be retrofitted with the present gas oxidation system, thus improving pollution abatement with minimal modifications to existing capital.

The present invention thus provides a reliable, cost effective means of oxidizing flue gas pollutants, such as nitric oxide, using activated forms of oxidizing compounds. These oxidized flue gases can then be effectively removed from the gas stream using existing pollution abatement devices such as wet scrubbers.

Further understanding of the processes and systems of the invention of the invention will be understood with reference to the brief description of the drawings and detailed description which follows herein.

BRIEF DESCRIPTION OF DRAWINGS

Aspects of the invention are illustrated in the following drawings. The elements of the drawings are not necessarily drawn to scale, emphasis instead being placed on clearly illustrating principles of the invention.

DETAILED DESCRIPTION OF THE INVENTION

The present invention now will be described more fully hereinafter with reference to the accompanying drawings, in which preferred embodiments of the invention are shown. This invention can, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Further, the various control, monitoring, and electrical supply lines have been omitted by and large, to improve clarity of presentation and understanding.

Figure 1:
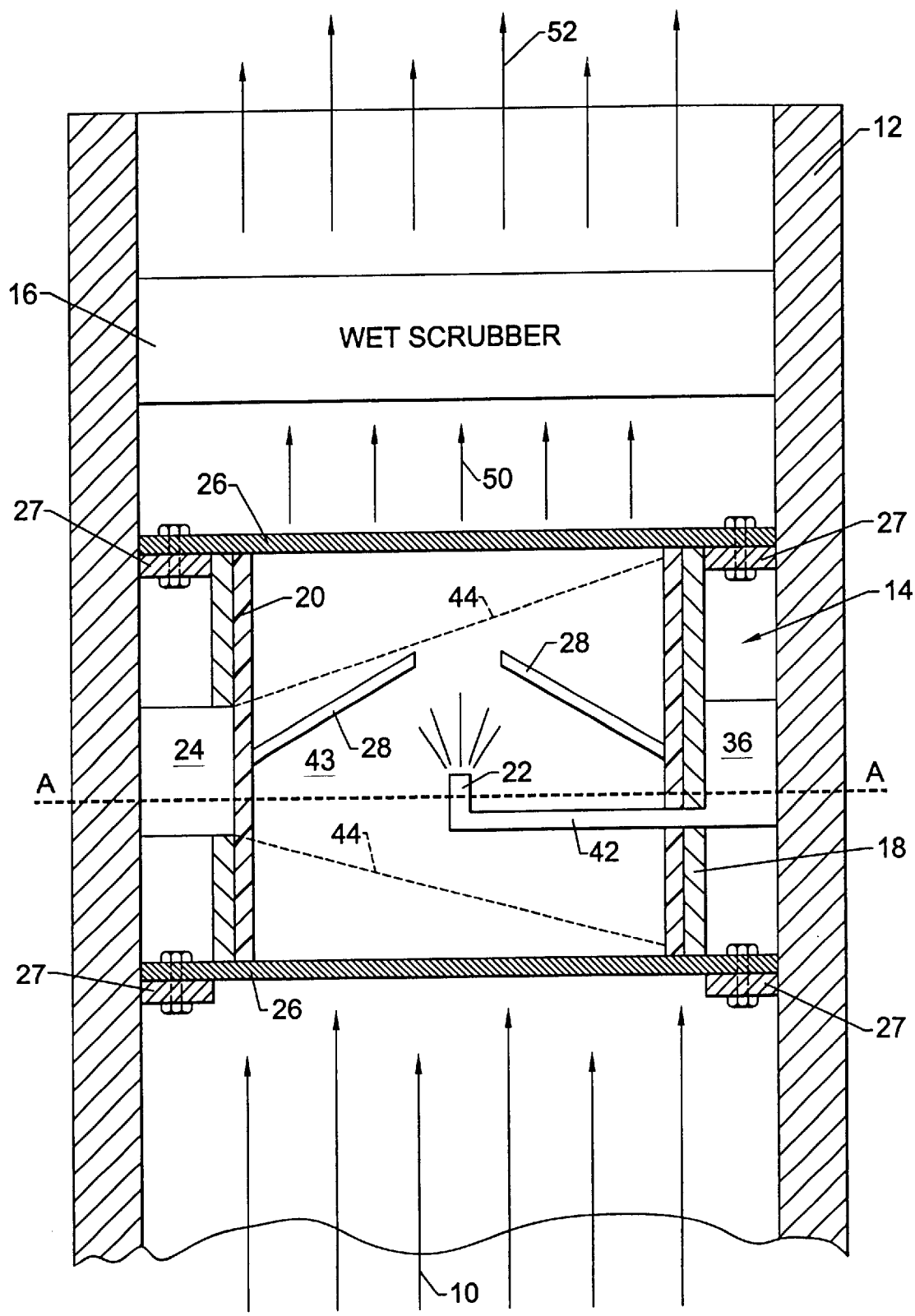
FIG. 1 illustrates a cutaway side schematic view of a flue containing an apparatus for oxidizing a nitric oxide-containing gaseous stream in accordance with one embodiment of the present invention that uses a nebulizer as the oxidizing compound distributor.

Referring now to FIG. 1, a multicomponent emission system in accordance with one embodiment of the invention is provided. The multicomponent emission system receives an gas stream 10 that can be generated by any number of combustion processes. Stationary combustion processes capable of producing a suitable gas stream 10 include utility boilers, industrial furnaces, and the like. In alternative aspects, mobile combustion processes such as employed in vehicles can provide the gas stream 10. Such combustion processes typically produce a significant effluent gas stream 10, typically transported out of the combustion chamber by means such as a flue 12 and ultimately released into the atmosphere.

The gas stream 10 generally contains a variety of pollutants that must be either removed or abated before the effluent can be returned to the atmosphere. In particular, the gas stream 10, also commonly referred to as the flue gas, generally includes combustion products, uncombusted fuel and air, as well as undesirable levels of sulfur oxides and nitrogen oxides. Nitrogen oxides are known to include nitric oxide and higher valence nitrogen oxides such as nitrogen dioxide, nitrogen trioxide, $NO_3$, and the like. The higher valence nitrogen oxides are readily removed from flue gas streams using absorbent methods such as wet scrubbers. However, the presence of nitric oxide in flue gases is troublesome because it is not readily removed by absorbent methods alone.

The multicomponent emission system of the present invention removes nitric oxide from effluent gaseous mixtures by first converting nitric oxide, a lower valence compound, into a higher valence nitrogen oxide in a gas oxidation system 14, and subsequently removing the higher valence nitrogen oxide using a conventional absorption method such as a wet scrubber 16. The present invention can also be used to convert other compounds, such as $SO_3$ and volatile organic compounds, into more desirable forms (e.g., $SO_2$ and $CO_2$). However, for ease of reference, the remainder of the specification will refer to the conversion of nitric oxide by oxidation.

Figure 2:
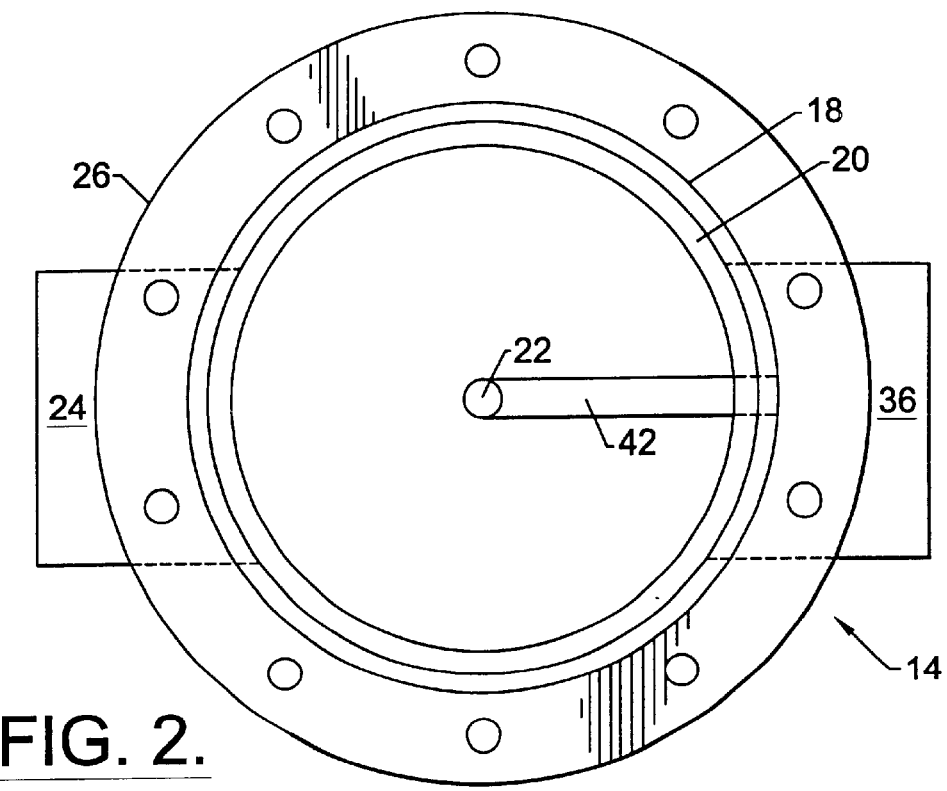
FIG. 2 illustrates a top sectional schematic view of an apparatus for oxidizing a nitric oxide-containing gaseous stream in accordance with one embodiment of the present invention that uses a nebulizer as the oxidizing compound distributor.

FIGS. 1 and 2 provide schematic top and side views of one embodiment of the gas oxidation system 14. In this embodiment, the gas oxidation system 14 is of a size suitable for insertion into a conventional combustion process flue 12, as shown in FIG. 1. As shown in FIGS. 1 and 2, the gas oxidation system 14 generally includes an oxidation chamber 18, a corrosion shield 20 lining the chamber, a distributor such as a nebulizer 22 for introducing an oxidizing solution, and a microwave generator 24.

The oxidation chamber 18 is preferably formed of a material that is impervious to and reflective of microwave radiation such as a metallic material. In a particularly advantageous embodiment, the oxidation chamber 18 comprises stainless steel. The oxidation chamber 18 can have any configuration. Preferably, the oxidation chamber 18 is cylindrical. In the alternative, the oxidation chamber 18 can be rectangular or of a custom shape suitable to the situation into which the system is integrated. Further, the oxidation chamber 18 can be fitted with two flanges 26, one attached to each end of the oxidation chamber 18, for use in securing the gas oxidation system 14 to the walls of the flue 12. In the advantageous aspect depicted in FIG. 1, the gas oxidation system 14 is secured within the flue 12 by means such as bolting the flanges 26 to flue supports 27. Alternatively, the gas oxidation system 14 can replace a section of the flue 12. In a further alternative embodiment, the gas oxidation system can be a self supporting or "stand alone" unit.

The environment generated within the oxidation chamber 18 is highly corrosive. Therefore, the oxidation chamber 18 is preferably lined with a chemically resistant corrosion shield 20 that protects the oxidation chamber 18 from the oxidizing compound employed in the present invention. The corrosion shield 20 can include any material that can both withstand the corrosive atmosphere created within the oxidation chamber 18 and transmit microwave energy through its thickness for significant periods of time without deteriorating. In one advantageous embodiment, the corrosion shield 20 is formed from a polymer, and is preferably tetra fluoro ethylene (TEFLON®), fiber-reinforced plastic (FRP) or ceramic.

As illustrated in FIGS. 1 and 4–6, the present apparatus can include baffles 28 that are attached to the corrosion shield 20. The baffles 28 are arranged at suitable angles to the axis of flow to facilitate mixing between the oxidizing solution introduced into the oxidation chamber 18 and the gas stream 10. The baffles 28 can be formed of any suitable material capable of withstanding the corrosive atmosphere created within the oxidation chamber 18 such as the materials used to form the corrosion shield 20. In addition, a seal, such as an elastomeric ring or gasket that conforms to the shape of the flange 26, can be provided to seal the system to prevent the migration of gases from the system that might constitute a hazard or the migration of gases into the system that might reduce the system efficiency.

As noted previously, a distributor introduces the oxidizing solution into the oxidation chamber 18. In the embodiment provided in FIGS. 1 and 2, a nebulizer 22 emits an aerosol comprised of oxidizing solution into the oxidation chamber 18. Nebulizers, known in the art for atomizing liquids, generally introduce fine sprays into gases by breaking liquids passing through the nebulizer into extremely small droplets. In the embodiment illustrated in FIG. 2, the nebulizer 22 is located at the cross-sectional and longitudinal centers of the oxidation chamber 18. However, the nebulizer 22 can be provided in any location that provides adequate mixing between the oxidizing solution and the gas stream 10. The nebulizer 22 can also be placed at a location upstream of the oxidation chamber 18. In this embodiment, an element of the gas stream 10 initially encounters the nebulizer 22 and thereafter enters the region interior to the oxidation chamber 18. Further, a plurality of nebulizers can be employed within the oxidation chamber in a wide variety of configurations.

Figure 3:
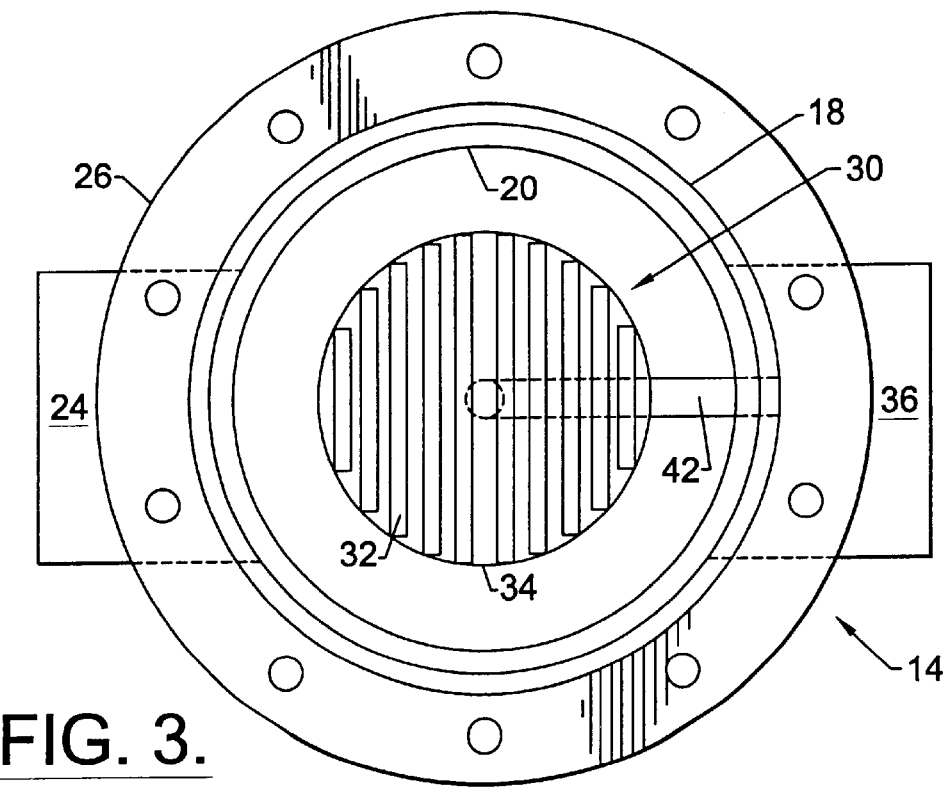
FIGS. 3 and 4 illustrate top and side sectional schematic views of another aspect of the invention that uses a wicking system as the oxidizing compound distributor.
Figure 4:
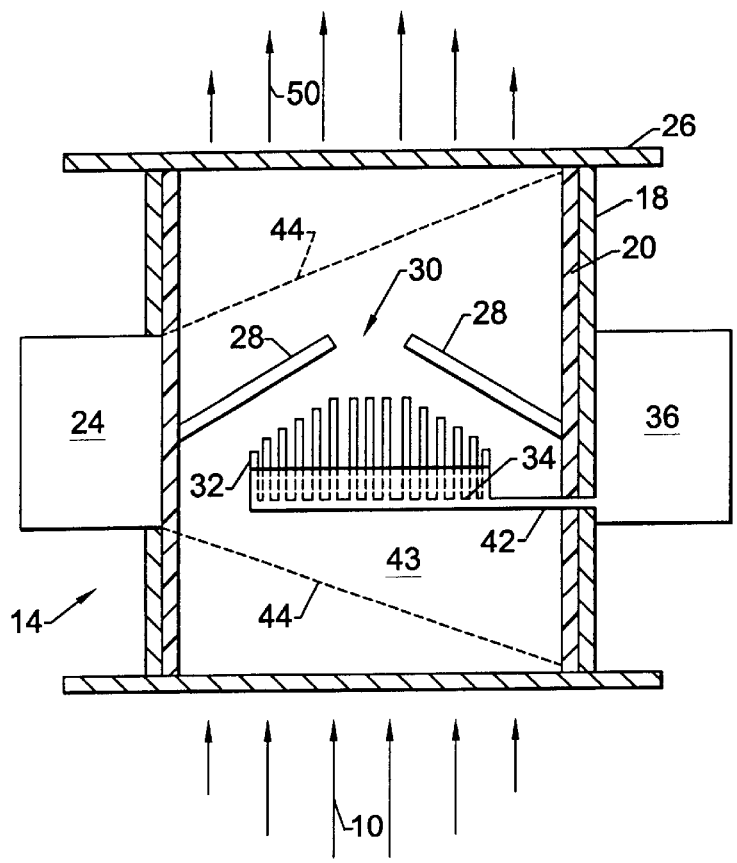

FIGS. 3 and 4 illustrate the use of an alternative distribution system. In particular, a wicking system 30 introduces oxidizing solution into the oxidation chamber 18. The wicking system 30 diffuses a vapor comprised of oxidizing solution into the oxidation chamber 18. The wicking system 30 includes a plurality of wicks 32 that are fixed parallel to the longitudinal axis of the oxidation chamber 18 and that extend into the oxidation chamber 18. The lower end of the wicks 32 extend down into a tray 34 filled with oxidizing solution and naturally absorb and transport the solution towards the upper end of the wicks 32. Following its transport, the oxidizing solution diffuses as a vapor from the upper end of the wicks 32 into the oxidation chamber 18. In the embodiment illustrated in FIGS. 3 and 4, the wicking system 30 is located at the cross-sectional and longitudinal center of the oxidation chamber 18. However, the wicking system 30 can be provided in another location that provides adequate mixing between the oxidizing solution and the gas stream 10. The wicking system 30 can further be provided in a wide variety of configurations. The wicks 32 are typically formed from any suitable fibrous material capable of withstanding the corrosive oxidizing environment and microwave energy without deteriorating. Fibrous materials suitable for use as wicks 32 include a range of fiber-forming synthetic polymers, particularly polymers such as polypropylene, polyethylene, fiberglass and the like.

Figure 5:
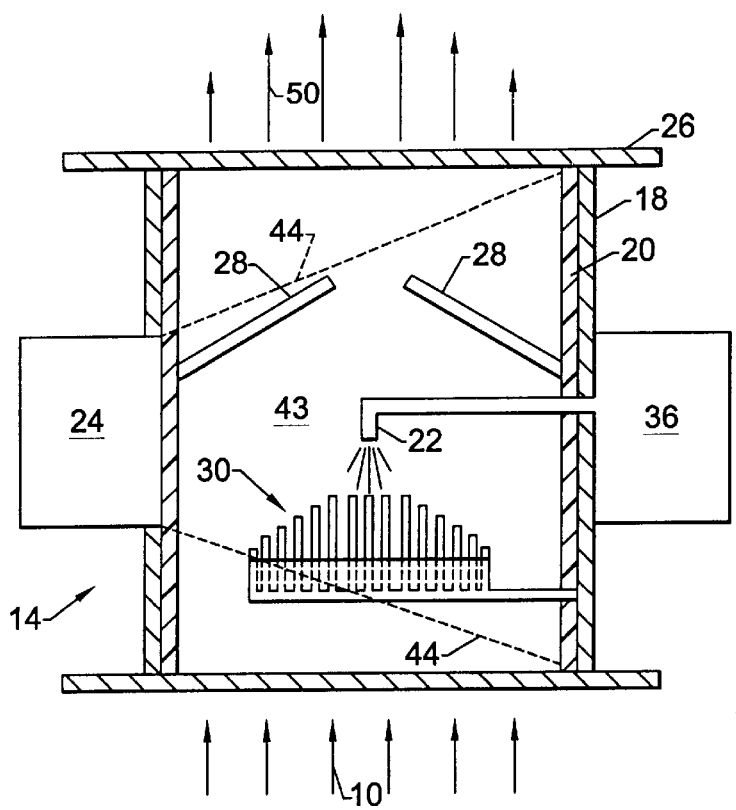
FIG. 5 illustrates a side sectional schematic view of another aspect of the invention that uses a nebulizer in combination with a wicking system as the oxidizing compound distributor.

In FIG. 5, the distributor includes both a nebulizer 22 and a wicking system 30. In the particular embodiment illustrated in FIG. 5, the nebulizer 22 supplies an aerosol of oxidizing compound into the oxidation chamber 18 slightly downstream of the wicking system 30. The wicking system 30 in this aspect of the invention catches excess oxidizing solution supplied by the nebulizer 22 and delivers the excess oxidizing solution as a vapor to the oxidizing chamber 18.

Figure 6:
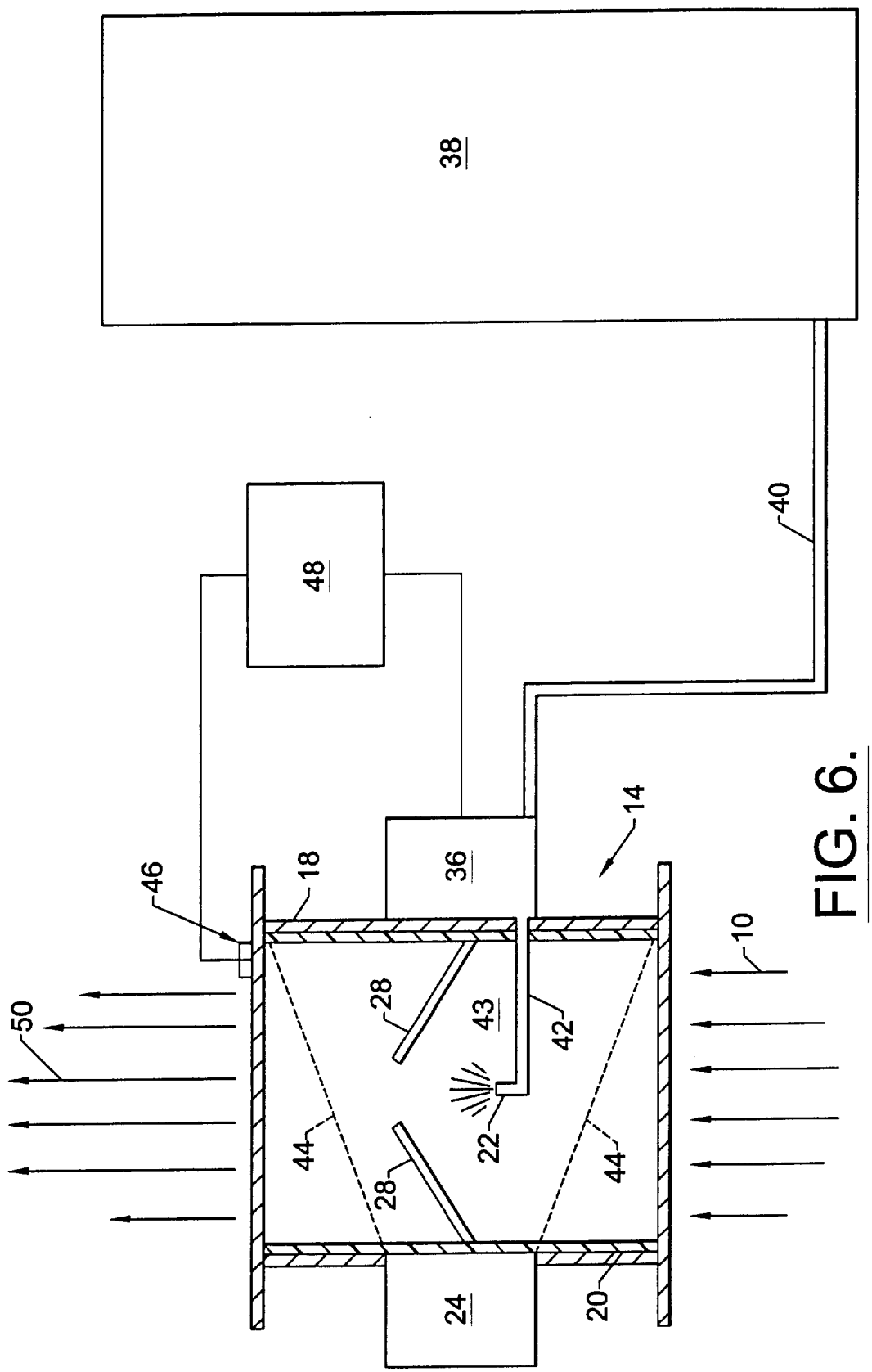
FIG. 6 is a cutaway side schematic view of another aspect of the invention that includes a closed loop control system for monitoring exiting nitric oxide concentrations and an oxidizing solution pumping system.

Turning now to the embodiment of FIG. 6, oxidizing solution is supplied to the distributor by a pumping system 36 that is capable of supplying the required flow of oxidizing solution under accurate flow metering and further able to withstand the corrosive effects of the oxidizing solution. An oxidizing solution reservoir 38 is provided as a holding tank for the oxidizing solution. An oxidizing solution supply line 40 connects the oxidizing solution reservoir 38 to the oxidizing solution pumping system 36 allowing the flow of oxidizing solution from the oxidizing solution reservoir 38 to the oxidizing solution pumping system 36. The oxidizing solution pumping system 36 preferably includes a metering pump or a centrifugal pump with variable pumping volume, or can alternatively include a centrifugal pump operated using a demand switch. The suction side of the oxidizing solution pumping system 36 is connected to the oxidizing solution reservoir 38 via the oxidizing solution supply line 40. The pressure side of the oxidizing solution pumping system is connected to the distributor via the oxidizing solution injection line 42.

The oxidizing solution includes an oxidizing compound dissolved in a solvent. Oxidizing compounds for use in the present invention include any suitable reactant capable of quickly oxidizing nitric oxide upon activation by microwave energy. Hydrogen peroxide is considered particularly advantageous for use as the oxidizing compound of the present invention. An amount of activated oxidizing compound sufficient to oxidize the nitric oxide in the gas stream to a higher valence nitrogen oxide is employed. The amount of oxidizing solution required can vary based on process conditions. However, a molar ratio of activated oxidizing compound to nitric oxide of from about 1:1 to about 2:1 is beneficially employed in the present invention. More preferably, a molar ratio of activated oxidizing compound to nitric oxide of about 1:1 is employed.

Solvents for use in the oxidizing solution include any inert carrier capable of dissolving the oxidizing compound that is suitable for exposure to microwave energy and that can be later emitted to the atmosphere. In particular, water can be advantageously employed as the oxidizing solution solvent. In one beneficial aspect of that embodiment, the oxidizing solution pumping system 36 pumps an aqueous hydrogen peroxide solution having a concentration of between 5% and 70% from the oxidation solution reservoir 38 through the oxidation solution supply line 40 and the oxidation solution injection line 42 to a distributor such as a nebulizer 22. In an alternative embodiment, pure oxidizing compound is introduced into the oxidation chamber by a distributor.

As shown in FIGS. 1–6, a microwave generator 24 is positioned so as to emit electromagnetic energy into the oxidation chamber 18. Microwave energy is generally defined as electromagnetic radiation having frequencies between 300 to 300,000 MHz. Four frequencies were established by the Federal Communications Commission for use in industrial and scientific microwave heating and drying: 915, 2450, 5800, and 22,125 MHz. As an example, the microwave frequency most often employed in microwave ovens is 2450 MHz, commonly with an energy output of 600 to 700 Watts. The microwave radiation provided in the present invention is in an amount sufficient to activate the oxidizing compound. In one aspect of the present invention, a microwave generator 24 operating at 2450 MHz and rated at 800 Watts is employed.

The microwave generator 24 irradiates the oxidation chamber 18 through an opening defined in the wall of the oxidation chamber 18. In one embodiment, the opening defines a rectangular shape. The microwave generator 24 can be mounted on the surface of the oxidation chamber 18 directly over the opening. The microwave generator 24 can be mounted flush to or optionally protrude through the opening defined in the oxidation chamber 18. The corrosion shield 20 covers the exposed surface of the microwave generator 24 thus protecting the microwave generator from attack by the oxidizing compound.

In general, microwave energy is generated by means such as a magnetron as is well known in the art. The magnetron typically emits microwave energy from an antenna enclosed in a vacuum tube. In the present invention, the microwave generator 24 provides microwave energy through an antenna or antenna array, thus producing a microwave energy zone 43, defined by the area between broken lines 44, within the oxidation chamber 18. The microwave energy zone 43 is preferably located so as to maximize the energy applied to the oxidizing solution. In particular, when a wicking system is used the microwave energy zone 43 is positioned such that the oxidizing solution in the upper end of the wicks 32 is irradiated. Further, the microwave energy zone 43 is preferably positioned such that the flow of the gas stream 10 passes through the microwave energy zone 43, thereby exposing the gas stream to the activated oxidation compound. In a further embodiment, baffles 28 are used to enhance contact between the activated oxidizing compound and the gas stream 10 by inducing turbulence. In one aspect of the invention, the microwave energy introduced into the chamber is in an amount such that the energy is completely absorbed thus protecting the magnetron by minimizing the microwave energy reflected back to the microwave generator 24. Also, in one aspect of the invention a mode stirrer can be employed within the microwave generator 24 thus promoting a more even distribution of the microwaves within the microwave energy zone 43.

The electromagnetic energy present in the microwave energy zone 43 activates the oxidation compound. A sufficient amount of microwave radiation is emitted into the oxidation chamber 18 to activate the oxidizing compound. The result of this activation is threefold. First, vaporization of the oxidation compound occurs. Second, the temperature of the oxidation compound is elevated. For example, when hydrogen peroxide is used, the temperature is elevated from ambient up to just below or at the boiling point of hydrogen peroxide, which is 152° C. under standard conditions. Third, the microwave energy results in the formation of highly reactive and short lived free radical forms of the oxidizing compound. In particular, hydrogen peroxide forms two free radicals, OH. and HOO..

The various forms of activated oxidizing compound react with the nitric oxide present in the gas stream 10 oxidizing the NO to $NO_2$ or other higher valence nitrogen oxides. The dwell time in the oxidation chamber 18 is typically fairly short. For example, the oxidizing solution can be irradiated for a period of time ranging from about 0.01 to about 5 seconds, preferably for about 0.05 to about 3 seconds.

In one advantageous embodiment, activated hydrogen peroxide reacts with the nitric oxide present in the gas stream 10. In a further beneficial aspect of the invention, at least about 80%, and preferably at least about 99%, of the nitric oxide present in the gas stream 10 is oxidized into higher valence nitrogen oxides. Further, the inclusion of methanol in the oxidizing solution can be beneficial in the conversion of certain lower valence compounds such as $SO_3$, CO and volatile organic compounds present in the gas stream to more readily scrubbable or innocuous compounds, such as $SO_2$, $CO_2$, and the like, as taught in U.S. Pat. No. 5,670,122.

The microwave generator 24 and the oxidizing solution pumping system 36 are both mounted on the outside surface of the oxidation chamber 18. Their position in relation to each other is not critical except to provide clearance for access and other components. For example, the microwave generator 24 can be oriented at an angle of between 45–180° with respect to an axis A perpendicular to the flue 12 as shown in FIG. 1. In the advantageous embodiment depicted in FIG. 1, the microwave generator is at an angle of 180° with reference to the oxidizing solution pumping system 36.

The effluent gas oxidation system of the present invention can be operated as a continuous or batch process. In one aspect of the invention, the microwave generator 24 is operated continuously. The power level of the microwave generator that is selected typically depends on the ambient temperature of the gas, the gas stream flow rate and the cross-sectional area of the flue 12. In particular, the power level is typically set at lower levels for higher gas ambient temperatures and higher levels for higher gas flow rates and flue cross-sectional areas. The rate of oxidizing compound or solution delivery from the distributor is preferably sufficient to oxidize substantially all of the nitric oxide in the gas stream without using excess oxidizing compound. As will be understood by those skilled in the art, the rate of delivery will depend on the gas flow rate and temperature, and the nitric oxide content in the gas stream.

In one embodiment of the present invention, the rate at which the oxidizing compound or solution is delivered by the distributor is controlled using a closed loop system as shown in FIG. 6. In this embodiment, a sensor 46 is used to monitor the amount of nitric oxide exiting the oxidation chamber 18. The sensor 46 provides data to a controller 48 that regulates the oxidation solution pumping system 36. Based on the controller 48 output, oxidation solution pumping system 36 provides the distributor with the amount of oxidizing compound required to minimize residual nitric oxide in the oxidized gas stream 50. The oxidizing compound can be introduced into the oxidation chamber 18 on either a continuous or intermittent basis. Further, in an alternative embodiment, a closed loop controller regulates whether the microwave generator is on or off or can otherwise regulate the microwave energy emitted into the oxidation chamber 18. In yet another aspect of the invention, a closed loop system controls both the oxidation solution pumping system 36 and the microwave generator 24.

As illustrated in FIG. 1, after exiting the effluent gas oxidation system 14, the oxidized gas stream 50 is subjected to an absorption process to remove the higher valence nitrogen oxide compounds, e.g. nitrogen dioxide, from the gas stream prior to emitting the scrubbed gas stream 52 to the atmosphere. In particular, the oxidized gas stream 50 can be passed through a wet scrubber 16 and treated therein with a scrubber medium. The wet scrubber 16 can be a conventional scrubber such as those installed on utility boilers. Advantageously, the wet scrubber 16 is of the type commonly used by power plants for sulfur dioxide scrubbing. In general, a wet scrubber employing an absorbing solution of water and an alkali in the form of nitrates is known in the art for use in the absorption of higher valence nitrogen oxides.

The present invention will be further illustrated by the following non-limiting example.

EXAMPLE

A self-supporting gas oxidation apparatus was provided that included of a calibrated gas supply, an oxidation chamber, a microwave generator, a distributor, and a nitric oxide monitor. The oxidation chamber, roughly rectangular in shape, was 6 inches tall by 4 inches deep by 4 inches wide. The microwave generator supplied approximately 650 W of energy to the oxidation chamber on a continuous basis. To simulate the use of a wicking system distributor, a cylindrical glass vessel containing an oxidizing solution was placed in the microwave energy zone of the oxidation chamber. The oxidizing solution was 200 ml of an aqueous solution of hydrogen peroxide at a concentration of 50%.

The gas stream employed was a standard automotive emissions tester's calibration gas having a nitric oxide concentration entering the oxidation chamber of 2084 ppm. The gas stream flowed continuously through the oxidation chamber at a constant rate of 0.65 liters per minute. After exiting the oxidation chamber, the oxidized gas stream passed through two 300 ml water traps before entering an emissions analyzer. An emissions analyzer was used to monitor the nitric oxide present in the oxidized gas stream in ppm.

After an initially purging the oxidation chamber with the calibration gas, the microwave generator was turned on. A series of tests were performed. In one study, a constant 0.65 liter/min flow of calibration gas was subjected to microwave radiation within the oxidation chamber, and residual nitric oxide concentrations in the oxidized gas was determined over a prolonged length of time. In this study, an initial reading of 1200 ppm nitric oxide was noted at 6 minutes into the test, dropping to 25 ppm at 13 minutes, 6 ppm at 18 min and 4 ppm at 21.5 minutes. The initial time period of the study was used to raise the temperature of the oxidizing solution from ambient to vaporization temperature. Numerous additional tests exploring the stability and range of operation of the system showed residual nitric oxide concentrations down into the range of 4 to 10 ppm consistently.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for oxidizing a nitric oxide-containing gaseous stream comprising:

(a) an oxidation chamber for contacting a nitric oxide-containing gaseous stream with an activated oxidizing compound;

(b) at least one distributor comprising a wicking system to introduce said oxidizing compound into said oxidation chamber, said distributor supplying said oxidizing compound through a first opening defined in said oxidation chamber;

(c) at least one microwave generator for irradiating said oxidizing compound and thereby forming said activated oxidizing compound, said microwave generator emitting microwave energy through a second opening defined in said oxidation chamber; and (d) a corrosion shield lining interior surfaces of said oxidation chamber and covering exposed portions of said microwave generator in said second opening of said oxidation chamber.

2. An apparatus for oxidizing a nitric oxide-containing gaseous stream comprising:

(a) an oxidation chamber for contacting a nitric oxide-containing gaseous stream with an activated oxidizing compound;

(b) at least one distributor comprising a nebulizer in conjunction with a wicking system to introduce said oxidizing compound into said oxidation chamber, said distributor supplying said oxidizing compound through a first opening defined in said oxidation chamber;

(c) at least one microwave generator for irradiating said oxidizing compound and thereby forming said activated oxidizing compound, said microwave generator emitting microwave energy through a second opening defined in said oxidation chamber; and (d) a corrosion shield lining interior surfaces of said oxidation chamber and covering exposed portions of said microwave generator in said second opening of said oxidation chamber.

3. An apparatus for oxidizing a nitric oxide-containing gaseous stream comprising:

(a) an oxidation chamber for contacting a nitric oxide-containing gaseous stream with an activated oxidizing compound;

(b) at least one distributor comprising a wicking system to introduce said oxidizing compound into said oxidation chamber, said distributor supplying said oxidizing compound through a first opening defined in said oxidation chamber;

(c) an irradiation system consisting essentially of at least one microwave generator for irradiating said oxidizing compound and thereby forming said activated oxidizing compound, said microwave generator emitting microwave energy through a second opening defined in said oxidation chamber; and (d) a corrosion shield lining interior surfaces of said oxidation chamber and covering exposed portions of said microwave generator in said second opening of said oxidation chamber.

* * * * *